United States Patent
Schön et al.

(10) Patent No.: US 11,475,712 B2
(45) Date of Patent: Oct. 18, 2022

(54) METHOD AND DEVICE FOR AUTOMATIC GESTURE RECOGNITION

(71) Applicant: AUDI AG, Ingolstadt (DE)

(72) Inventors: Torsten Schön, Pietenfeld (DE); Michael Schlittenbauer, Ingolstadt (DE); Michael Morgott, Pietenfeld (DE)

(73) Assignee: AUDI AG, Ingolstadt (DE)

( * ) Notice: Subject to any disclaimer, the term of this patent is extended or adjusted under 35 U.S.C. 154(b) by 364 days.

(21) Appl. No.: 16/615,217

(22) PCT Filed: Apr. 18, 2018

(86) PCT No.: PCT/EP2018/059935
§ 371 (c)(1),
(2) Date: Nov. 20, 2019

(87) PCT Pub. No.: WO2018/219551
PCT Pub. Date: Dec. 6, 2018

(65) Prior Publication Data
US 2020/0175265 A1    Jun. 4, 2020

(30) Foreign Application Priority Data
Jun. 1, 2017 (DE) .................. 10 2017 209 262.9

(51) Int. Cl.
*G06V 40/20* (2022.01)
*G06F 3/01* (2006.01)
(Continued)

(52) U.S. Cl.
CPC .............. *G06V 40/20* (2022.01); *B60R 11/04* (2013.01); *G06F 3/017* (2013.01); *G06K 9/628* (2013.01); *G06K 9/6256* (2013.01); *G06N 3/084* (2013.01)

(58) Field of Classification Search
CPC ......... G06V 40/20; B60R 11/04; G06F 3/017; G06K 9/6256; G06K 9/628; G06N 3/084
See application file for complete search history.

(56) References Cited

U.S. PATENT DOCUMENTS

| 9,727,821 B2* | 8/2017 | Lin ................... G06N 7/005 |
| 11,019,107 B1* | 5/2021 | Wagster ............. H04L 43/10 |

(Continued)

FOREIGN PATENT DOCUMENTS

DE    11 2014 003 305 T5    5/2016

OTHER PUBLICATIONS

Cruz Ricardo et al "Tackling class imbalance with ranking" 2016 International Joint Conference on Neural Networks (IJCNN), IEEE, Jul. 24, 2016, pp. 2182-2187, XP032992435 (Year: 2016).*

(Continued)

*Primary Examiner* — Grant Sitta
(74) *Attorney, Agent, or Firm* — Maier & Maier, PLLC

(57) ABSTRACT

A method for automatic gesture recognition in which, by a machine learner data of a respective gesture of a variety of gestures executed by a user and captured by at least one sensor gestures of a class are assigned to a variety of predetermined classes, and in which the machine learner is trained with a training data set, which is divided into predetermined data segments. The respective data segments are data segments of the training data set are assigned to the variety of predetermined classes by means of the machine learner. A respective contribution, with the respective assignment processes for the assignment of respective data segments are incorporated into the automatic gesture recognition of a particular class.

6 Claims, 1 Drawing Sheet

(51) Int. Cl.
   *G06K 9/62*  (2022.01)
   *B60R 11/04* (2006.01)
   *G06N 3/08*  (2006.01)

(56) References Cited

U.S. PATENT DOCUMENTS

| | | | |
|---|---|---|---|
| 11,093,845 B2* | 8/2021 | Zoldi | G06N 5/025 |
| 11,271,957 B2* | 3/2022 | Kulkarni | G06F 17/18 |
| 11,277,425 B2* | 3/2022 | Kulkarni | G06K 9/6215 |
| 2014/0279716 A1 | 9/2014 | Cormack et al. | |
| 2016/0321540 A1* | 11/2016 | Towal | G06N 3/08 |

OTHER PUBLICATIONS

English-language translation of International Preliminary Report on Patentability dated Dec. 12, 2019, in corresponding International Application No. PCT/EP2018/059935; 8 pages.

Examination Report dated Jul. 6, 2017 in corresponding German application No. 10 2017 209 262.9; 36 pages.

International Search Report and Written Opinion of the International Searching Authority dated Jul. 5, 2018 in corresponding International application No. PCT/EP2018/059935; 28 pages.

Song, et al. "Distribution-Sensitive Learning for Imbalanced Datasets", 10th IEEE International Conference and Workshops on Automatic Face and Gesture Recognition, 2013, pp. 1-6; 6 pages.

Gibson, et al. Deep Learning. Early release. USA: O'Reilly Media, Inc, Aug. 2016, Chapter: "6th Tuning Deep Networks", Section: "Working with Class Imbalance"; 4 pages.

Owens, "Training Neural Nets with Class Imbalance", Jan. 20, 2014; 6 pages.

Cruz, et al. "Tackling Class Imbalance with Ranking", International Joint Conference on Neural Networks, Jul. 24, 2016, pp. 2182-2187; 6 pages.

Examination Report dated Mar. 9, 2022, in connection with corresponding German Application No. 102017209262.9 ( 16 pp., including machine-generated English translation).

* cited by examiner

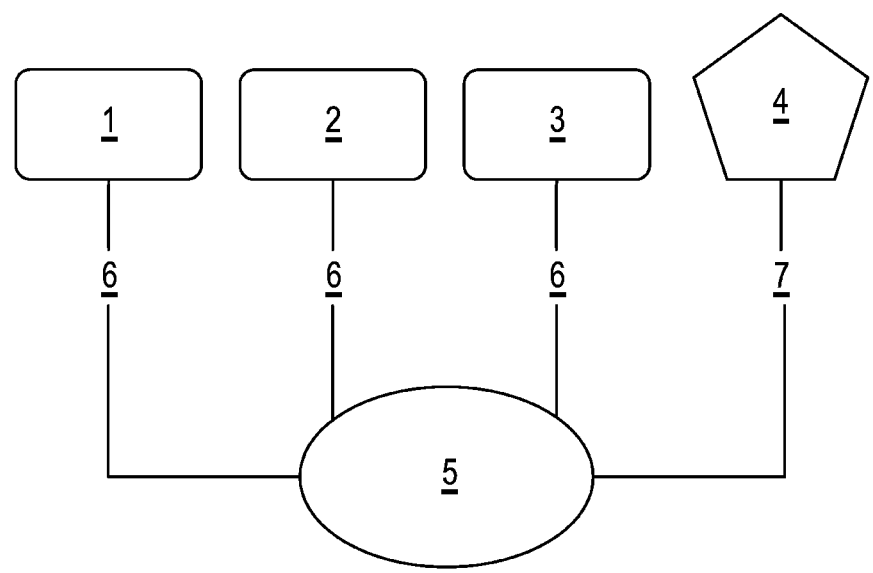

METHOD AND DEVICE FOR AUTOMATIC GESTURE RECOGNITION

FIELD

The presented invention relates to a method for the automatic recognition of gestures of a user, and to a gesture detection system configured to carry out the presented method.

BACKGROUND

Currently, gesture recognition algorithms are frequently implemented using methods that are based on supervised learning. In what is known as a deep learning process, model parameters of an artificial neural network are trained with the help of data sets of random modalities. Gesture recognition algorithms are trained using pre-segmented data sets, in which each data segment is assigned a class according to a predefined formula. A machine learner trained in this manner is suitable only for classifying data that are likewise subdivided into data segments. Therefore, either a purely offline recognition of pre-segmented sequences is possible, or for a real-time application, another algorithm is required, which segments input data with an unavoidable latency to enable data segments to subsequently be classified, i.e., assigned to respective classes, using the gesture recognition algorithm. Corresponding model parameters of a relevant machine learner are optimized by maximizing the accuracy of the assignment of respective data segments to respective classes.

Since in traditional optimization approaches, inequalities in frequency distribution among the respective classes are not taken into account, situations may arise in which a machine learner very accurately assigns frequently occurring data segments to a respective class, and very inaccurately assigns less frequently occurring data segments to a respective class.

U.S. 2014 279 716 A1 discloses a method for classifying electronic information using active learning methods in which data are classified with the aid of loss functions and gesture inputs.

DE 11 2014 003 305 T5 discloses a method for processing an acoustic signal by means of a learning method in which speech is classified, with consideration of loss functions and input from a user.

An artificial neural network having filters for gestures performed by a user is disclosed in U.S. 2016/0321540 A1.

The document by Song, Y.; Morency, L. P.; Davis, R., entitled "Distribution-sensitive learning for imbalanced data sets", in 10th IEEE International Conference and Workshops on Automatic Face and Gesture Recognition (PG) 2013, 2013, pp. 1-6, discloses a gesture recognition method in which a training data set is analyzed and weighted prior to a learning process.

The document by Gibson, Adam; Patterson, Josh, entitled "Deep Learning. Early Release", USA, O'Reilly Media, Inc, August 2016, Chapter "6. Tuning Deep Networks", the section entitled "Working with Class Imbalance", ISBN 978-1-4919-1425-0, discloses a method for adjusting a loss function of a machine learner during training.

The document by Owens, Adams entitled "Training Neural Nets with Class Imbalance," Jan. 20, 2014, discloses a method for balancing an artificial neural network.

Against this background, it is an object of the presented invention to provide a machine learner that recognizes gestures performed by a user with the greatest possible accuracy.

To attain the above-stated object, a method for automatic recognition of gestures that are used to control a component of a vehicle is presented. According to the presented method, data of a respective gesture from a plurality of gestures performed by a user and detected by at least one sensor are assigned by a machine learner to a respective class from a plurality of predefined classes. In said method, the machine learner is trained using a training data set that is or will be subdivided into predefined data segments, and during the training, the machine learner assigns respective data segments of the training data set to respective classes of the plurality of predefined classes. A respective input, with which respective assignment operations for assigning respective data segments to a respective class are entered into the automatic gesture recognition, is factored in using at least one weighting factor. It is further specified that, during the training, the machine learner is optimized by means of a loss function, which weights the respective assignment operations for assigning respective data segments to a respective class using the at least one weighting factor, which is generated based on the frequency of assignment operations assigning respective data segments to a respective class.

In said optimization, typically each class is assigned a weighting factor, with which an input of the respective assignment operations that assign data segments to said class is factored into the automatic gesture recognition. This means that, depending upon the number of predefined classes, a corresponding number of weighting factors result.

Embodiments of the presented invention will be apparent from the description and the dependent claims.

The training provided according to the invention ultimately serves to configure the machine learner, in particular an artificial neural network, to assign motions performed by a user to at least one predefined class that is associated with a gesture, for example. The recognition, by the machine learner, of a respective gesture based on an assignment of a motion by the user to a class associated with the respective gesture allows control commands for controlling respective components of a vehicle to be generated, enabling gesture control of the components.

The presented method serves in particular to provide for the most accurate recognition possible of gestures performed by a user, i.e. operating gestures that are used to control a device, such as a vehicle or a component of the vehicle. It is specified that data acquired by at least one sensor, such as a camera, are classified by means of the machine learner provided according to the invention, i.e., are assigned to respective classes. For this purpose, it is provided according to the invention that first, a respective data set supplied by the sensor is subdivided into data segments, and then said data segments are assigned by the machine learner to respective classes.

It is further specified according to the invention that a machine learner that is used to recognize respective gestures, or a corresponding machine learning function, is trained taking a loss function into account, which weights respective assignment operations assigning respective data segments to respective classes, or the likelihood of said assignment, by means of, i.e. using, the at least one weighting factor, which is generated based upon the frequency of assignment operations assigning respective data segments to a respective class. This means that a respective input, with which assignment operations for assigning respective data segments to a respective class are incorporated into the automatic gesture recognition, is weighted using the at least one weighting factor. In so doing, the loss function, with which a deviation between an optimum recognition performance and an actual recognition performance of a respective machine learner is mapped mathematically, can be used as an optimization function for optimizing the machine learner by changing the machine learner until the loss function reaches a local minimum. At the local minimum of the loss function, the machine learner is at its optimum adjustment.

During training, to avoid configuration of a machine learner based solely on the frequency with which a respective assignment operation assigning a data segment to a class occurs, weighting factors are provided that influence or define the influence of a respective assignment operation on the machine learner, or on an adjustment, or on a configuration of the machine learner in response to a respective assignment operation. For instance, it may be provided that an assignment operation is weighted with a weighting factor of "0.1", meaning that the assignment operation is entered into the loss function as 10%. Since the loss function is used to configure the machine learner, i.e., to adjust an internal structure of the machine learner, such as a weighting of connections/edges between nodes if the machine learner is in the form of an artificial neural network, a respective weighting factor influences the machine learner, e.g., a corresponding artificial neural network, by influencing the loss function.

Once a respective machine learner has been trained, the machine learner can be used to achieve a highly precise assignment of data acquired by a sensor to a number of predefined classes, without the machine learner being optimized or overtrained very specifically for only one class.

To recognize respective gestures performed by a user, i.e., to assign respective data corresponding to a gesture to a predefined class that is associated with a respective gesture, and to generate a control command associated with the class, a user is generally monitored continuously by means of a sensor, such as a camera. The sensor therefore generates a data set that comprises both data that do not represent a gesture and data that do represent a gesture. Data that do not represent a gesture are typically over-represented, i.e., occur more frequently in a data set than data that represent a gesture or correspond to a gesture.

In the prior art, such over-representations of data that do not correspond to a gesture in a data set acquired by a respective sensor may result in situations in which a machine learner trained using said data set is configured very specifically for optimal recognition performance for data that do not correspond to a gesture, and is accordingly configured less specifically to an optimal recognition performance for data that do correspond to a gesture. Such a misconfiguration may occur, for example, if an assignment or an assignment operation of a first data segment from a respective training data set to a first class occurs more frequently, i.e., for example, ten times more frequently, than an assignment or an assignment operation of a second data segment to a second class, so that the machine learner receives feedback ten times more frequently from the assignment or the assignment operation of the first data segment than from the assignment or the assignment operation of the second data segment. Accordingly, with such training the machine learner is optimized particularly heavily toward the assignment or the assignment operation of the first data segment to the first class, potentially making the machine learner particularly poorly suited for an assignment or an assignment operation of the second data segment to the second class. Such a machine learner is referred to as mistrained.

To avoid mistraining of a respective machine learner, i.e., training that leads to sub-optimal recognition performance for classes that occur less frequently than other classes, the presented method provides for various assignment operations assigning respective data segments to respective classes in training a respective machine learner to be weighted, in which a respective input of the various assignment operations assigning the respective data segments to the respective classes is factored in appropriately to the automatic gesture recognition. For this purpose, it is provided in particular for the influence of the various classes on an analysis performed by the machine learner, and thus on an assignment accuracy of the machine learner for respective classes, to be weighted based upon the frequency with which said classes are recognized or the assignment operations associated therewith performed by the machine learner. For this purpose, a weighting factor can be selected that is proportional to the frequency of assignment of respective data segments to a respective class, and the reciprocal thereof can be multiplied by a probability with which respective data segments will be assigned to a class. The result of using the weighting factor is that the less influence is exerted on the configuration or training of the machine learner, the more frequently a corresponding class will be recognized. Of course, any other mathematical relationship between a frequency with which a respective data segment is assigned to a respective class, i.e., a frequency with which a specific assignment operation occurs, and a value of a corresponding weighting factor may also be selected, to be entered appropriately into the loss function.

In particular, it is provided that a weighting factor for a respective class or for respective assignment operations associated with said respective class is selected such that, if the class is provided or recognized particularly frequently, it will be factored in less heavily in an assignment operation associated with that respective class than a class that is provided or recognized particularly rarely. In other words, a respective assignment operation that assigns a data segment to a class that is recognized frequently will be entered less heavily into the loss function than a respective assignment operation to a class that is recognized less frequently.

The weighting factor according to the invention can be used to factor in classes that are recognized with varying frequencies in a balanced relationship to one another in an unbalanced data set during training.

The at least one weighting factor provided according to the invention therefore prevents a respective machine learner from being trained specifically for frequently assigned or frequently recognized classes to the detriment of a recognition rate for rarely assigned or rarely recognized classes. For this purpose, the at least one weighting factor balances an influence/input, exerted by respective classes or corresponding assignment operations associated with these classes on an adjustment/configuration of correlations between respective layers or nodes of the machine learner during training, among different classes. Accordingly, a respective machine learner is trained, in particular non-specifically or broadly, using the at least one weighting factor provided according to the invention so that the machine learner can recognize as many classes as possible, as accurately as possible.

The presented method is based, in particular, on training that uses data that are subdivided into data segments, so that respective data segments are assigned by a respective machine learner to a respective class. It is therefore provided that the at least one weighting factor provided according to the invention is generated based upon a frequency of assignment operations assigning data segments to a respective class, so that frequently occurring assignments or assignment operations assigning data segments to classes contribute less heavily to a change or to an adjustment of connections between layers, i.e., edges between nodes of the machine learner, than do rarely occurring assignments or assignment operations assigning respective data segments to respective classes.

Training is a central step that gives a machine learner, such as an artificial neural network, its recognition capabilities. During training, weights and bias of all neurons in the network are gradually adjusted such that the artificial neural network maps inputs to desired outputs. The starting point is an artificial neural network with randomly chosen weights. In supervised learning, an input is then mapped by the randomly selected artificial neural network to an output, which is then compared with the desired output. The deviations (errors) between the desired output and the actual output of the artificial neural network are then used to correct the weights in the artificial neural network in small steps. The algorithm used to perform supervised learning is called backpropagation.

In backpropagation, the resulting error is propagated backwards through the artificial neural network to adjust the weights. The starting point for the backpropagation algorithm is a deviation or an error made in the calculation by the artificial neural network in a current state. This deviation is calculated using the aforementioned loss function.

The goal of training is ultimately to find a local minimum for the loss function.

It is provided that, during training, the machine learner is optimized using the loss function that comprises the at least one weighting factor. In this process, it is provided that in the loss function, a frequency of an assignment or of an assignment operation assigning data segments to a respective class is factored in by using a respective weighting factor.

The loss function, which indicates the accuracy, i.e., the degree of conformity of a respective assignment of respective data segments to a respective class as predicted by a machine learner with an actual respective assignment of the respective data segments to the respective class, can be used to assess the quality of the machine learner. Accordingly, a loss function is particularly advantageously suitable as an optimization function for a machine learner in that the machine learner is modified/adjusted until the loss function reaches a local minimum. The local minimum can be calculated, for example, as the zero point of a respective loss function.

In particular, it is provided that the machine learner provided according to the invention is optimized using a loss function that comprises or factors in the at least one weighting factor provided according to the invention. Therefore, the machine learner is modified or optimized taking the at least one weighting factor into account. In particular, it can be provided for a loss function to factor in all recognized assignments or assignment operations that assign respective data to respective classes, and to weight these individually by means of a respective weighting factor calculated specifically for a respective assignment, i.e., a respective assignment operation or a respective class associated therewith. Such a weighting of respective assignments or respective assignment operations allows the influence of frequently occurring assignments, e.g., of data that do not contain gestures, to be limited to the loss function, and thereby, to the machine learner per se.

One possible embodiment of a loss function, as described above, is represented by formula (1).

$$\text{Loss} = -\frac{1}{P}\sum_{i=0}^{P-1}\frac{1}{J}\sum_{k=0}^{J-1}\log\left(\frac{1}{m_a}\hat{y}_{gt,i,k}\right) \tag{1}$$

In formula (1), "gt" stands for a ground truth or a respective class assigned correctly according to the ground truth, "i" stands for a training example, "J" stands for a training example length, "k" stands for a data segment, "$_y$ gt,i,k" stands for a probability of assignment of a data segment "k" of "ŷ gt,i,k" a training example "i" to a class according to a ground truth, i.e., for a probability of detecting a ground truth "yi, k" with the given model, and "P" stands for the size of a respective data set. It should be noted that during a data segment k, only one class can occur; said class can be determined using gt=argmax (yi, k) and will be declared accordingly below. The factor "$m_{gt}$" indicates a weighting factor for assignment operations assigning respective data segments to the respective class according to the ground truth, and is either calculated in advance or, if necessary, determined dynamically, i.e., generated during a training process, and is thus adjusted individually to the respective training data set.

According to formula (1), a respective weighting factor "m" is multiplied as a reciprocal value by a respective calculated assignment probability "ŷ" of data segments to the respective class. Since respective weighting factors are normalized according to a gesture that occurs the least or the most rarely, it is ensured that no logarithm with a value greater than 1 must be generated.

In training, a training data set is specified, the training data set being subdivided into predefined data segments. It is conceivable for respective gestures associated with the data segments to have different lengths or to comprise a "blank gesture", i.e., a motion that does not correspond to any deliberate gesture. This "blank gesture" must also be incorporated into the training process. As mentioned above, this raises the problem of an unbalanced relationship between the gestures. For training, a training data set in the form of a video is used, for example, the video being subdivided into selected sections (clips), and therefore into selected data segments. Actions or motions that do not correspond to any gesture and are now to be used during training to train the artificial neural network thus are also factored into the training data set. Originally, each frame of the video is assigned a class. However, in the present approach, multiple frames are combined to form what is known as a clip, i.e., a data segment, whereby the corresponding classes are also combined into one class. In the possible embodiment, if a class assigned to a specific gesture occurs a single time, the entire data segment comprising this specific gesture will then be assigned to said class. Only when a data segment contains exclusively blank gestures is said corresponding data segment also assigned to the class associated with the blank gesture. In the case of very brief gestures, this prevents all associated data segments, i.e., data segments that comprise said brief gestures, from being erroneously assigned to a blank gesture. In a further embodiment, the ratio between the gestures is normalized according to the gesture with the lowest frequency or occurrence, so that this gesture will also be entered into the calculation or configuration of the artificial neural network. This solves the problem, stated in the introductory portion above, of certain classes not being taught in the correct proportion in the case of an unbalanced data set. Said ratio therefore serves as the weight for calculating the loss, and is accordingly entered into the aforementioned loss function via the aforementioned weighting factor. It is conceivable for the ratio to be calculated prior to the start of training, adapted to the predefined training data set, or to be determined online during training.

The object of the training is ultimately to find a model that is mapped by the artificial neural network and that uses input values to calculate output values that correspond to actual values, known as ground truth values. For this purpose, in the possible embodiment, a loss function for a backpropagation algorithm is formulated, which uses a negative logarithm of what is known as a likelihood. This results in a sum of probabilities, and, factoring in mean values, the aforementioned equation (1) results as a negative-log-likelihood loss function. As was already mentioned above, the loss function is weighted to incorporate the aforementioned ratio between the gestures. The dynamically calculated weighting factor in is multiplied as a reciprocal value by the calculated probability y. The true value gt is considered in this calculation. Since the weighting factor is normalized according to the least frequently occurring gesture, it is ensured that no single weight or weighting factor will be less than 1. This is necessary to guarantee that no logarithm having a value greater than 1 must be generated. The calculated value of the loss function then serves as an error for calculating correction values of model parameters.

Formula (1) is derived from formula (2), in which, for a backpropagation algorithm as is typically used for training artificial neural networks, a negative logarithm of a probability of a correct assignment of a data segment to a respective class is used for training a respective artificial neural network.

$$\text{Loss}_{neg|neg\ likelihood} = -\frac{1}{P}\sum_{i=0}^{P-1}\frac{1}{J}\sum_{k=0}^{J-1}\log(\hat{y}_{gl,i,k}) \qquad (2)$$

In formula (2), "gt" stands for a ground truth or a respective class, "1" stands for a training example, "i" stands for a training example length, "k" stands for a data segment, "ŷ" stands for a probability of assignment of a data segment to a class, and "P" stands for a size of a respective data set.

In a further possible embodiment of the presented method, it is provided that, as already mentioned above, weighting factors of respective assignments or assignment operations assigning respective data segments to respective classes are normalized according to a class to which data segments are assigned the least.

Since, with an optimization or training of an artificial neural network using formula (2), heavily represented or frequently assigned classes exert a very heavy influence on the artificial neural network, and a loss function according to formula (2) will likely result in a local minimum that factors in predominantly these frequently assigned or disproportionately recognized classes, the network outputs, i.e., the output layer, of the artificial neural network are weighted based upon the frequency of a respective "ground truth label" or an assignment to a respective class.

To normalize the influence of respective weighting factors on a respective machine learner, the value of a respective weighting factor can be interpreted in relation to another weighting factor. For this purpose it can be provided, in particular, for respective weighting factors to be normalized according to a class to which the fewest data segments are assigned, or which is recognized most rarely, so that this most rarely recognized class is assigned a value of "1", for example.

In a further possible embodiment of the presented method, it is provided that a respective weighting factor for weighting the proportion/input with which respective assignment operations for assigning respective data segments to a respective class are incorporated into the automatic gesture recognition is factored as a reciprocal value into the loss function.

If a weighting factor is entered into the loss function as a reciprocal value and influences the machine learner by said value, the class that is recognized most rarely will have the greatest relative influence on the machine learner.

Regardless of the respective normalization steps, by factoring the weighting factor in as the reciprocal of a respective value for the frequency of assignment of data segments to a respective class, the relative influence of a frequently recognized or assigned class on a respective machine learner is minimized more, the more frequently data segments are assigned to the class.

The proposed method has been tested in particular for machine learners in the form of artificial neural networks, and is therefore suitable for the optimization of artificial neural networks. Although there are no findings for machine learners other than artificial neural networks, the functioning of the presented method could also be suitable for optimizing other machine learners.

In a further possible embodiment of the presented method, it is provided that the at least one weighting factor is dynamically updated during training of the machine learner.

To adjust respective weighting factors specifically to a respective training data set, it may be provided for a respective weighting factor to be updated dynamically, i.e., after every recognition process of a class by a respective machine learner, for example. In that case, all weighting factors may be updated in parallel, or only those weighting factors that weight a class currently being recognized or an assignment operation associated therewith may be updated selectively.

In a further possible embodiment of the presented method, it is provided that the at least one weighting factor is calculated prior to training, and during the training is fixedly defined.

By using a fixed weighting factor, any change in the weighting factors as a result of changes in other weighting factors can be ruled out, so that a corresponding training process can be very brief and efficient.

In a further possible embodiment of the presented method, it is provided that after training, the machine learner automatically subdivides respective data acquired by the at least one sensor into data segments and assigns the data segments to respective predefined classes.

Once a respective machine learner has been fully trained, or once a machine learning optimization process has been completed, the machine learner can be used to recognize gestures, i.e., to assign data acquired by a sensor to respective classes. In this process, it is provided in particular that an algorithm for carrying out the presented method is used both for segmentation, i.e., for subdividing the acquired data into data segments based, for example, on a time of occurrence or an acquisition chronology, and for classification, i.e., for assigning respective data segments or the data corresponding to a data segment to a predefined class.

The presented invention further relates to a gesture detection system for a vehicle, comprising at least one sensor for detecting gestures performed by a user, and a control unit. It is provided that the control unit is configured to assign, by means of a machine learner, data of a respective gesture, from a plurality of gestures performed by a user and detected by means of the at least one sensor, to a respective class from a plurality of predefined classes. It is further provided that the control unit is configured to train the machine learner using a training data set that is subdivided into predefined data segments, and during the training, to use the machine learner to assign respective data segments of the training data set to respective classes of the plurality of predefined classes, wherein a respective input, with which respective assignment operations for assigning respective data segments to a respective class are incorporated into the automatic gesture recognition, is factored in by means of at least one weighting factor, and wherein the control unit is further configured to optimize the machine learner during the training by using a loss function, wherein the loss function weights a respective input, with which respective assignment operations for assigning respective data segments to a respective class are incorporated into the automatic gesture recognition, using at least one weighting factor, generated based upon the frequency of assignment operations assigning respective data segments to a respective class.

The presented method is used in particular for operating the presented gesture detection system.

Further advantages and embodiments will be apparent from the description and the accompanying drawings.

It is understood that the features mentioned above and those yet to be explained below may be employed not only in the combination specified in each case, but also in other combinations or alone, without departing from the scope of the present invention.

BRIEF DESCRIPTION OF THE DRAWING

The invention is illustrated schematically in the drawing in the context of embodiments, and will be described schematically and in detail with reference to the drawing.

FIG. 1 shows a schematic diagram of a sequence of steps in the training of a machine learner, according to one possible embodiment of the method according to the invention.

DETAILED DESCRIPTION

In FIG. 1, various data segments 1 to 4 of a training data set are depicted. The training data set has been recorded by means of a camera in a vehicle and has been divided into data segments 1 to 4 by a technician, for example. While no gesture has been performed by a user of the vehicle in data segments 1 to 3, in data segment 4 a gesture has been performed by the user to activate an entertainment system of the vehicle.

If all of data segments 1 to 4 were factored in equally during training of an artificial neural network 5 provided for recognizing the gesture, i.e., exerting equal influence on a configuration of the artificial neural network 5, artificial neural network 5 would be optimized particularly heavily toward assignment operations for data segments 1 to 3, since all the data of these data segments 1 to 3 are to be assigned to a "noise" class, or motions without a gesture. Accordingly, artificial neural network 5 would be trained three times toward the most exact recognition possible of the "noise" class, and only once toward the "gesture for entertainment system" class. Such training will result in good recognition performance for the class "noise" but will not result in good recognition performance for the class "gesture for entertainment system".

Adjustments made during training to optimize the artificial neural network 5 may cause the recognition performance for the class "gesture for entertainment system" to decrease in favor of the recognition performance for the class "noise". To maximize recognition performance for the class "gesture for entertainment system", it is provided according to the invention that, in a process for modifying the artificial neural network 5, the class "gesture for entertainment system" is weighted using a first weighting factor 6 and the class "noise" is weighted using a second weighting factor 7.

Both the first weighting factor 6 and the second weighting factor 7 are selected based upon a frequency of assignment operations assigning respective data segments 1 to 4 to the respective classes. Since in the present case the class "noise" has been recognized three times, i.e., three data segments, or data segments 1 to 3, have been assigned to the class "noise", the class "noise" is assigned a value of "3". Since in the present case one data segment, specifically data segment 4, has been assigned to the class "gesture for entertainment system", the class "gesture for entertainment system" is assigned a value of "1".

To minimize the influence of the frequently recognized class "noise" on the artificial neural network 5 and to maximize the influence of the rarely recognized class "gesture for entertainment system" on the artificial neural network 5, during training of the artificial neural network 5 an optimization function, or loss function, is used, which multiplies a probability with which a data segment 1 to 4 will be assigned to a respective class by a reciprocal value of a respective weighting factor, in order to obtain a proportion of a respective assignment operation assigning a data segment 1 to 4 to a respective class in the optimization of neural network 5.

In this operation, a respective weighting factor, which is proportional to a frequency of assignment of a data segment to a respective class, is entered as a reciprocal value into the optimization function or loss function, so that said weighting factor decreases as the value of the respectively recognized assignments to said respective class increases. Accordingly, a gesture that is recognized frequently, such as the "noise" class, results in a smaller adjustment of respective connections between respective layers or nodes of the artificial neural network 5 than do assignments that are recognized less frequently. Therefore, the class "gesture for entertainment system" is factored in particularly heavily in an optimization of the artificial neural network 5, so that artificial neural network 5 will recognize the class "gesture for entertainment system" particularly well.

The invention claimed is:

1. A method for the automatic recognition of gestures used to control a component of a vehicle comprising:
by a machine learner, data of a particular gesture of a variety of gestures carried out by a user and by at least one gesture captured by a particular class are assigned to a variety of predetermined classes,
wherein the machine learner is trained with a training data set, which is divided into predetermined data segments, wherein during the training respective data segments of the training data set are used by the machine learner assigned to the multitude of predetermined classes, wherein a respective contribution, with which respective assignment processes for assigning the respective data segments to a respective class are incorporated into the automatic gesture recognition, is taken into account by at least one weighting factor, wherein the at least one weighting factor to the weighting of the contribution, with the respective assignment processes for assigning the respective data segments to a respective class in the automatic gesture recognition is taken into account as a reciprocity in a loss function that optimizes the machine learner during training, with at least one weighting factor dynamically during the training of the machine learner is updated, and where the loss function has respective assignment operations to map the respective data segments to a particular class using the at least one, depending on a frequency of assignment operations, from the respective data segments to a weighting factor in each class, and where a control command associated with the respective class is generated and used to control the component of the vehicle, and where the weighting factor is one to the frequency of assignment operations of the respective data segments to the respective class proportional factor.

2. The method according to claim 1, wherein respective weighting factors respective data segments to respective classes are normalized according to a class to which the least data segments are assigned.

3. The method according to claim 1, wherein the machine learner is optimized by a local minimum of the loss function.

4. The method according to claim 1, wherein an artificial neural network is chosen as a machine learner.

5. The method according to claim 1, wherein the machine learner after a training automatically divides the data collected by at least one sensor into data segments and the data segments respective predetermined class.

6. A gesture sensing system for a vehicle, comprising:

at least one sensor for capturing gestures provided by a user and a control unit, wherein the control unit is configured to use a machine learner data of a particular gesture of a variety of gestures of a given class of predetermined gestures carried out by a user and captured by at least one sensor, and class, and where the control unit is still configured to train the machine learner with a training data set divided into predetermined data segments, and during the training respective data segments of the training data set by the machine learner to assign to each class of the variety of predetermined classes, and whereby the control unit is still configured to use at least one weighting factor to weight a contribution, with the respective assignment processes for assigning the respective data segments to the respective classes are included in the automatic gesture recognition, and at least one weighting factor is taken into account as a reversing value in a loss function, with which the machine learner is optimized during training, with at least one weighting factor being dynamically updated during machine learner training, and the control unit is configured to have a weighting factor assigned to the respective class to generate a control command and use it to control a component of the vehicle, and where at least one weighting factor is a factor proportional to the frequency of assignment operations of each data segment to the respective class.

* * * * *